(12) United States Patent
Kosht (10) Patent No.: US 12,384,628 B2
(45) Date of Patent: Aug. 12, 2025

(54) METHODS, SYSTEMS, AND ASSEMBLIES FOR POWER GENERATION FOR A MATERIAL HANDLING SYSTEM

(71) Applicant: INTELLIGRATED HEADQUARTERS, LLC, Mason, OH (US)

(72) Inventor: Danial Kosht, Loveland, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 288 days.

(21) Appl. No.: 18/314,268

(22) Filed: May 9, 2023

(65) Prior Publication Data

US 2024/0375876 A1    Nov. 14, 2024

(51) Int. Cl.
  *B65G 13/07* (2006.01)
  *H02K 3/02* (2006.01)

(52) U.S. Cl.
  CPC .............. *B65G 13/07* (2013.01); *H02K 3/02* (2013.01)

(58) Field of Classification Search
  CPC .................................. B65G 13/07; H02K 3/02
  USPC ........................................................ 310/179
  See application file for complete search history.

(56) References Cited

U.S. PATENT DOCUMENTS

| | | | | |
|---|---|---|---|---|
| 11,469,025 B2* | 10/2022 | Hartman | .................. | H01F 7/17 |
| 11,831,182 B1* | 11/2023 | Huang | .................... | H02J 50/10 |
| 12,100,988 B1* | 9/2024 | Daniels | ................. | H02J 7/1415 |
| 2021/0339961 A1* | 11/2021 | Ragan | ..................... | B65G 39/08 |
| 2021/0363822 A1* | 11/2021 | Blair | ..................... | H02K 11/0094 |
| 2023/0003296 A1* | 1/2023 | Heo | ....................... | F16H 59/105 |
| 2023/0248189 A1* | 8/2023 | Osborne, Jr. | .......... | A47K 10/36 242/564 |
| 2024/0051663 A1* | 2/2024 | Stegmiller | ............ | F16D 63/002 |
| 2024/0322647 A1* | 9/2024 | Macaluso | ............ | H02K 7/1846 |
| 2024/0326956 A1* | 10/2024 | Benedict | ............. | B65G 1/0478 |
| 2024/0364185 A1* | 10/2024 | Ganzermiller | ......... | B23D 45/16 |
| 2025/0042669 A1* | 2/2025 | Akkermans | ............ | B65G 21/18 |
| 2025/0112529 A1* | 4/2025 | Burchfield | ............. | H01R 39/04 |

FOREIGN PATENT DOCUMENTS

| | | |
|---|---|---|
| CN | 210120425 U | 2/2020 |
| CN | 211544884 U | 9/2020 |
| CN | 113277266 B | 12/2021 |
| CN | 215120446 U | 12/2021 |
| KR | 10-1966349 B1 | 4/2019 |

* cited by examiner

*Primary Examiner* — Rashad H Johnson
(74) *Attorney, Agent, or Firm* — Alston & Bird LLP (57) ABSTRACT

Methods, apparatuses, systems, computing devices, and/or the like are provided. In some embodiments, a power generation system is disclosed including a roller; an end cap fixedly connected to the roller, wherein the end cap is configured to be operably engaged with a material handling system; a plurality of magnets disposed on or within the end cap; and a pick-up assembly including one or more pick-up coils, wherein the pick-up assembly is configured to be operably engaged with the end cap and the material handling system, wherein the roller is configured to rotate such that the plurality of magnets rotate relative to the pick-up assembly and generate a magnetic flux configured to intersect the one or more pick-up coils and thereby generate a current.

20 Claims, 10 Drawing Sheets

METHODS, SYSTEMS, AND ASSEMBLIES FOR POWER GENERATION FOR A MATERIAL HANDLING SYSTEM

TECHNICAL FIELD

The present disclosure relates generally to power generation. In particular, the present disclosure relates to localized power generation for a material handling system.

BACKGROUND

Material handling systems for conveying, protecting, storing, and controlling products may utilize controller and sensors with solid-state circuits with wired connections to an AC/DC power supply. Alternatively, the solid-state circuits may be locally powered via one or more batteries.

These means of power delivery may have drawbacks, though. For example, delivering power via batteries may require guarding against electromagnetic interference (EMI). Delivering power via wired connection may require ensuring electromagnetic compatibility (EMC) of the connected devices, assemblies, and systems. Further, AC/DC power supplies may have large service costs, and proper battery disposal may lead to unnecessary labor, time, and cost expenses.

Through applied effort, ingenuity, and innovation, Applicant has solved problems relating to power generation for material handling systems by developing solutions embodied in the present disclosure, which are described in detail below.

SUMMARY

In general, embodiments of the present disclosure provide a power generation system and/or the like. In accordance with various embodiments of the present disclosure, a power generation system may include a roller; an end cap fixedly connected to the roller, wherein the end cap is configured to be operably engaged with a material handling system; a plurality of magnets disposed on or within the end cap; and a pick-up assembly including one or more pick-up coils, wherein the pick-up assembly is configured to be operably engaged with the end cap and the material handling system, wherein the roller is configured to rotate such that the plurality of magnets rotate relative to the pick-up assembly and generate a magnetic flux configured to intersect the one or more pick-up coils and thereby generate a current.

In some embodiments, the power generation system further includes an interface cable electrically connected to the pick-up assembly and configured to connect the pick-up assembly to one or more power supplies powering the material handling system.

In some embodiments, the roller includes a bore configured to receive at least a portion of the interface cable.

In some embodiments, the one or more power supplies includes a battery.

In some embodiments, the one or more pick-up coils include copper wiring.

In some embodiments, the pick-up assembly includes a receiving hole and the roller includes a rotor, wherein the rotor is configured to be disposed through at least a portion of receiving hole when the end cap is operably engaged with the material handling system.

In some embodiments, the one or more pick-up coils are disposed annularly around the receiving hole of the pick-up assembly.

In some embodiments, the end cap includes a molded end-cap fixedly attached to the roller.

In some embodiments, the material handling system includes a conveyor system configured to support one or more objects.

In some embodiments, the roller includes an active roller configured to spin freely relative to the material handling system.

In accordance with various embodiments of the present disclosure, there is provided a power generation system including a roller including a coil-coupled rotor configured to be fixed relative to the roller and having one or more coils; a magnetically-coupled stator configured to rotate relative to the coil-coupled rotor and having a plurality of magnets configured to generate a magnetic flux when the magnetically-coupled stator rotates, wherein the magnetic flux is configured to intersect the one or more coils of the coil-coupled rotor and thereby generate a current.

In some embodiments, the power assembly further includes an interface cable electrically connected to the pick-up assembly and configured to connect the pick-up assembly to one or more power supplies powering the material handling system.

In some embodiments, the roller includes a bore configured to receive at least a portion of the interface cable.

In some embodiments, the one or more power supplies includes a battery.

In some embodiments, the one or more pick-up coils have copper wiring.

In some embodiments, the pick-up assembly includes a receiving hole and the roller includes a coil-coupled rotor, wherein the coil-coupled rotor is configured to be disposed through at least a portion of receiving hole when the end cap is operably engaged with the material handling system.

In some embodiments, the one or more pick-up coils are disposed annularly around the receiving hole of the pick-up assembly.

In some embodiments, the end cap includes a molded end-cap fixedly attached to the roller.

In some embodiments, the material handling system includes a conveyor system configured to support one or more objects.

In accordance with various embodiments, there is provided a method of powering a material handling system including the steps of operably engaging the material handling system with a power generation system, wherein the material handling system includes: a roller; an end cap fixedly connected to the roller, a plurality of magnets disposed on or within the end cap; and a pick-up assembly including one or more pick-up coils. In some embodiments, the method further includes the steps of electrically connecting the one or more pick-up coils to one or more power supplies powering the material handling system; and rotating the roller relative to the material handling system such that the plurality of magnets generate a magnetic flux configured to intersect the one or more pick-up coils and thereby generate a current.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

Magnetic power generation involves using magnetic fields to generate electricity. Described generally, the magnetic field that surrounds a magnet "pushes" and "pulls" on electrons and can be used to align the electric field generated by the electrons into an electric current. For example, a magnet may be moved around a coil of copper wire (or the copper wire may be moved around the magnet), which causes the magnet's magnetic field to "push" the electrons in the copper wire into an electrical current.

According to various embodiments described in this disclosure, there is described a power generation system. In some embodiments, the power generation system may be used for powering components in a material handling system that may include a frame having one or more actively driven rollers and one or more passive or free spinning rollers. In some embodiments, the power generation system may include the active rollers and may use the active rollers to generate electricity for powering components in the material handling system or other components within a warehouse or distribution environment. In some embodiments, the active roller may include one or more caps, bores, rotors, and/or magnetically-coupled stators/armature.

In some embodiments, the system may include one or more magnets that are operably engaged with, embedded within, or otherwise configured to rotate with the active roller relative to at least the material handling system. In some embodiments, the magnet(s) are embedded into a roller's end cap. In some embodiments, the magnets are embedded directly into the shaft of the active roller, or one or more components of the active roller (e.g., a rotor or a stator). In some embodiments, these one or more magnets generate a rotating magnetic flux as the roller rotates. In some embodiments, this rotating magnetic flux may be rotated around one or more coils (e.g., copper wire) and thereby generate electricity that travels along the one or more coils. In some embodiments, the active roller may include an interface cable for transferring the generated electricity from the one or more coils to one or more power supplies that power the material handling system.

In some embodiments, the system may include a pick-up assembly that may be connected to a conveyor (e.g., connected to one of the conveyor's side rails), along with the roller. In some embodiments, the pick-up assembly includes the one or more coils and may be installed on the conveyor's side rail or otherwise operably engaged with a component of the material handling system. In some embodiments, the rotating magnetic flux intersects the pickup coil(s) and generates a waveform. In some embodiments, this waveform is then rectified into a DC supply that can be used to power the material handling system. In some embodiments, an air gap is left between the roller's molded bearing assembly such that the roller spins freely. In some embodiments, the one or more coils may be embedded directly into the shaft of the active roller or one or more components of the active roller (e.g., a rotor or a stator).

Hence, in at least this way, and as will be further described in this disclosure, as the active roller rotates, the power generation system generates electricity to power the material handling system.

Example Power Generation Systems

Figure 1:
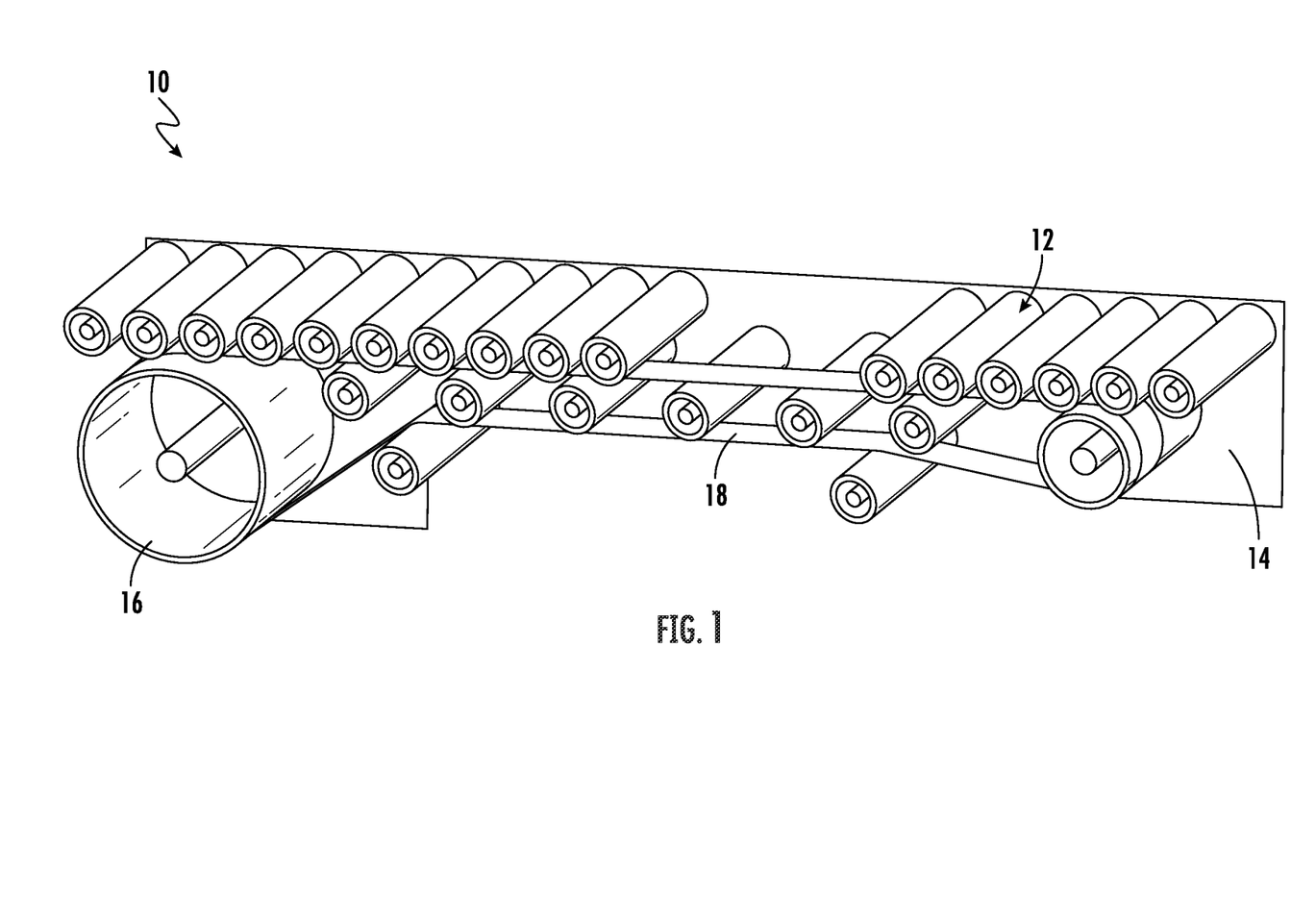
FIG. 1 is an angled top view of an example material handling system in accordance with various embodiments of the present disclosure.
Figure 2:
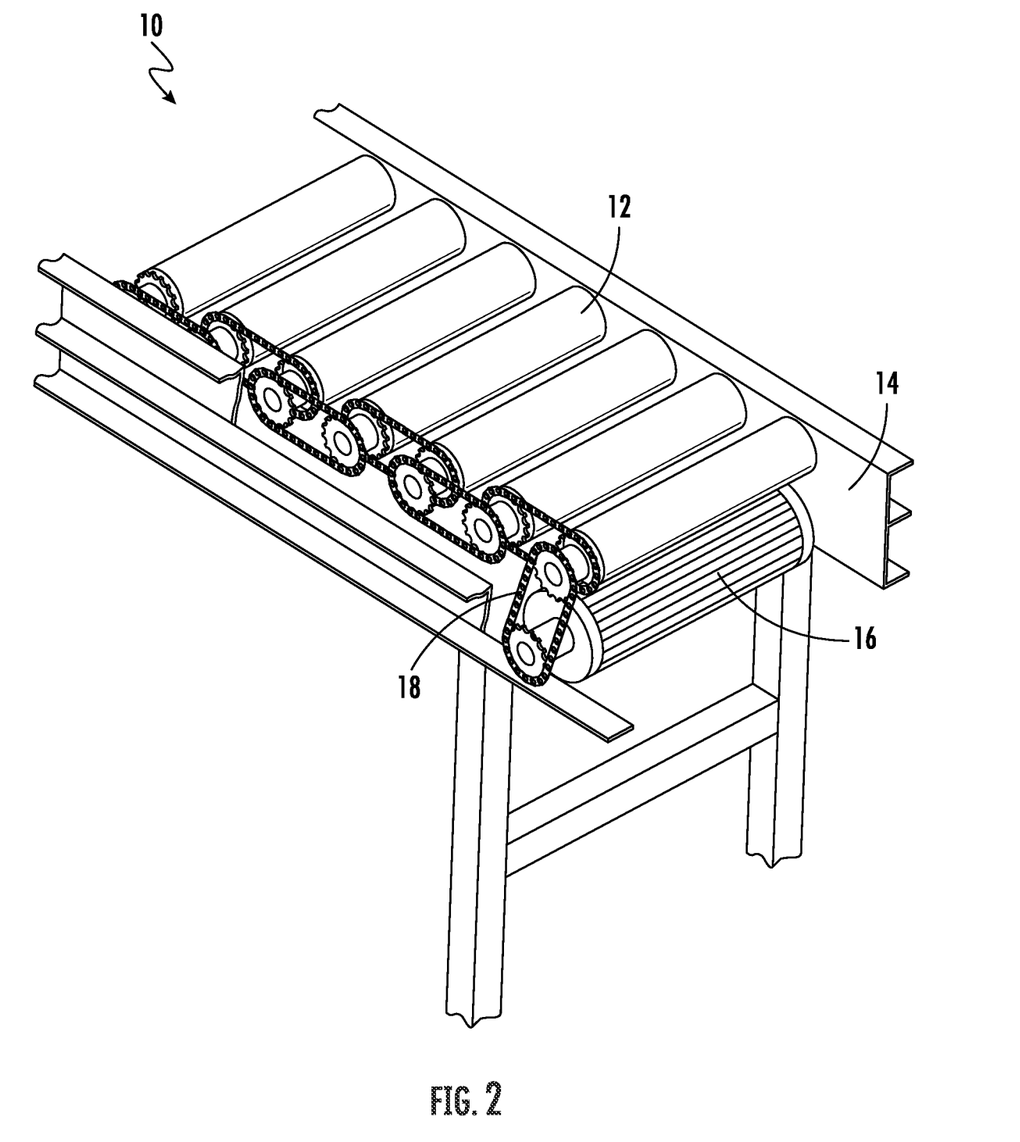
FIG. 2 is an angled top view of an example material handling system in accordance with various embodiments of the present disclosure.
Figure 3:
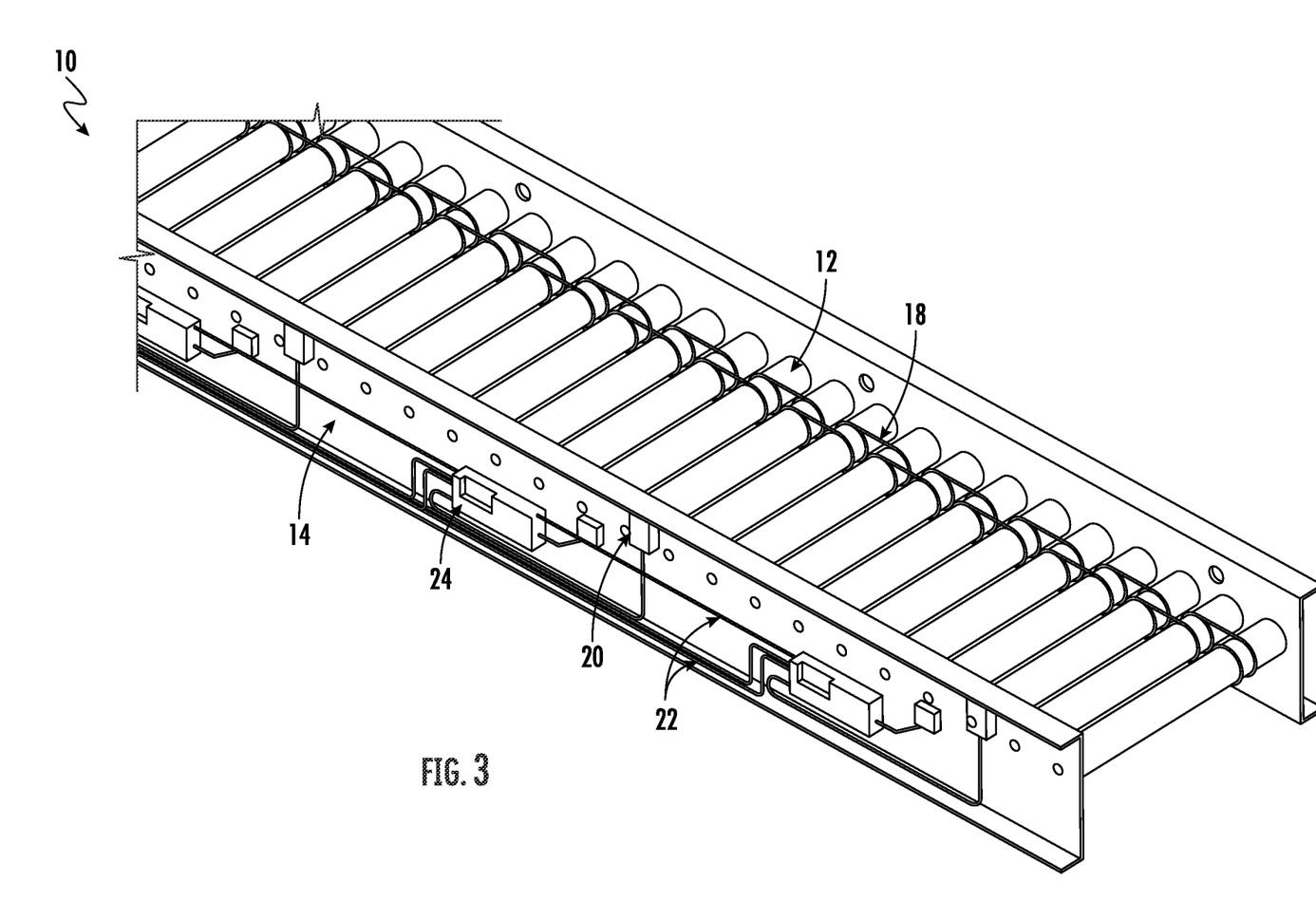
FIG. 3 is an angled top view of an example material handling system in accordance with various embodiments of the present disclosure.

FIGS. 1-3 show angled top views of an example material handling system 10. In some embodiments, the material handling system 10 may be configured to support and/or transport one or more objects throughout a facility (e.g., a distribution plant). In some embodiments, the material handling system 10 may include one or more bed rollers 12. In some embodiments, the one or more bed rollers 12 may be actively driven rollers or passive/free spinning rollers. In some embodiments, the one or more bed rollers 12 may be fixed to a frame 14. In some embodiments, the actively driven rollers of the bed rollers 12 may be driven by a motor, which may be operably coupled to the actively driven rollers of the bed rollers 12 be means of a drive pulley 16 and drive belt 18. In some embodiments, the drive belt 18 may be operably coupled to the actively driven rollers of the bed rollers 12.

In some embodiments, and referring in particular to FIG. 3, the material handling system 10 may include one or more sensors 20. In some embodiments, the one or more sensors 20 may be configured to detect one or more aspects of the material handling system 10 or the ambient conditions of the facility where it is placed. For example, the one or more sensors 20 may be configured to detect the weight and/or orientation of an object being supported by or transported by the material handling system 10. As another example, the one or more sensors 20 may be configured to detect the temperature of the facility in which the material handling system 10 is located.

In some embodiments, and still referring in particular to FIG. 3, the material handling system 10 may include one or more wiring harnesses 22 and one or more controllers 24. In some embodiments, the controllers 24 may be electrically connected to one or more of the bed rollers 12 by means of the wiring harnesses 22.

Figure 4:
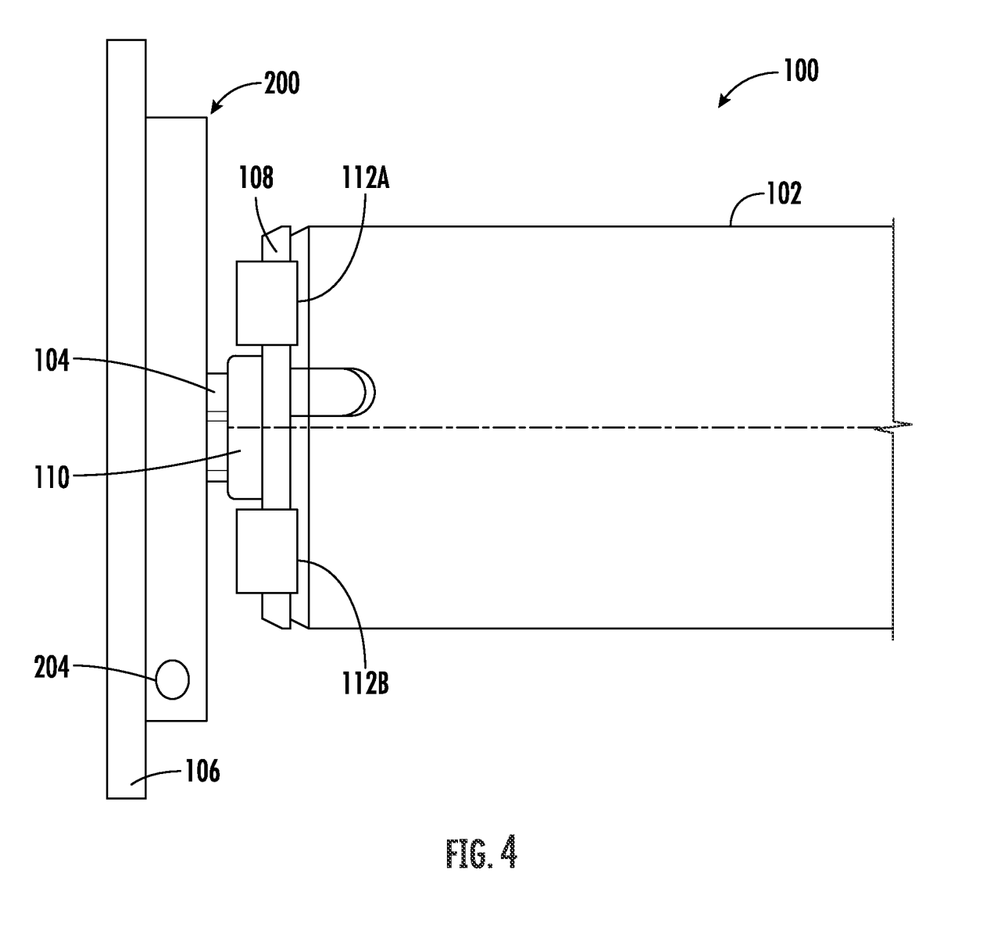
FIG. 4 is an elevation side view of an example power generation system in accordance with various embodiments of the present disclosure.
Figure 5:
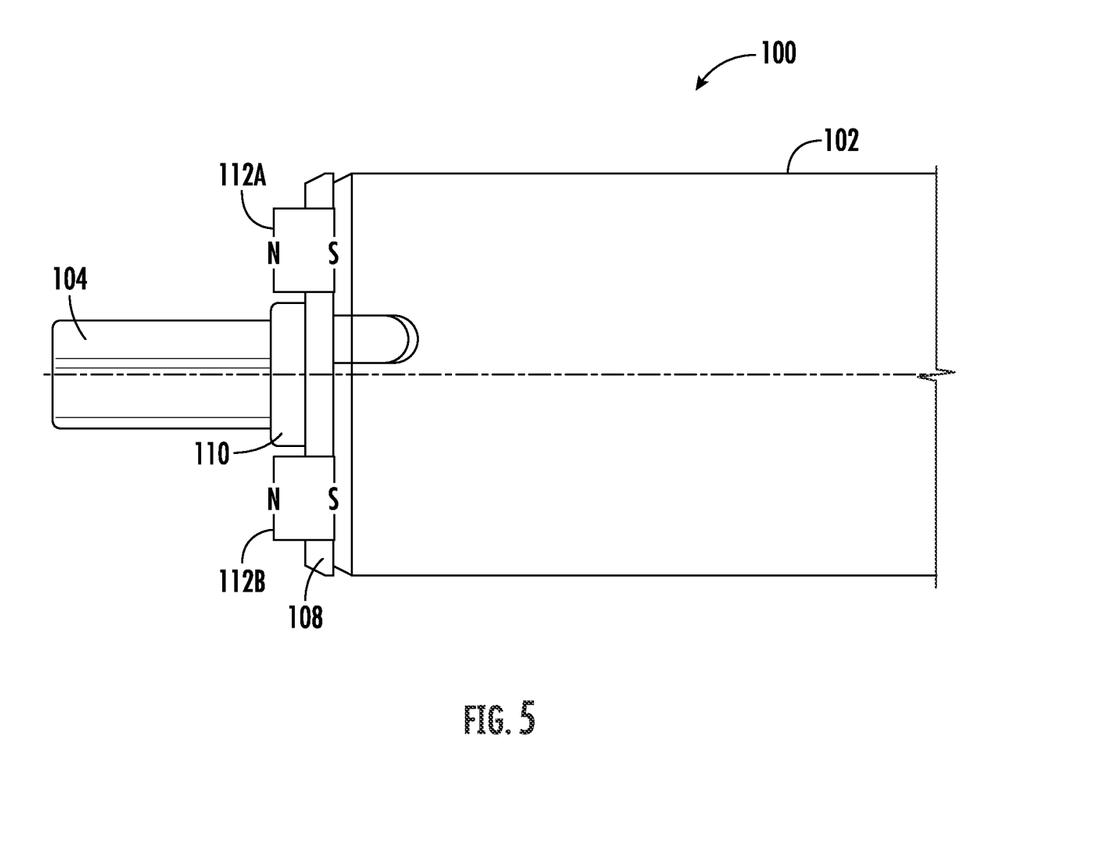
FIG. 5 is an elevation side view of an example roller with embedded magnets in accordance with various embodiments of the present disclosure.

FIG. 4 shows an elevation side view of an example power generation system 100. In some embodiments, the power generation system 100 may be configured to power a material handling system 10, such as the material handling system 10 shown in at least FIGS. 1-3 and configured to transport one or more objects, such as those found in warehouse and/or distribution environments. In some embodiments, the power generation system 100 may be a parasitic power generation system, such that the power generation system 100 generates power using at least some movement of the material handling system 10, as will be described in greater detail later in this disclosure. In some embodiments, the material handling system 10 may include a back-up and/or alternative power source (e.g., wired AC/DC supply and/or battery supply) in addition to the power generation system 100. In some embodiments, the power generation system 100 may be operably engaged with, fixedly attached to, or otherwise integrated with the material handling system 10 (e.g., via the conveyor rail 106 shown in at least FIG. 4). In some embodiments, the power generation system 100 may share controls and/or feedback systems with the material handling system 10, such that an operator may control the two systems simultaneously and/or in sequence.

In some embodiments, the power generation system 100 may include a roller 102. In some embodiments, the roller 102 may be a substantially cylindrical roller and configured to support one or more objects on its own or in conjunction with additional rollers. In some embodiments, the roller 102 may be operably engaged with the material handling system 10. In some embodiments, the roller 102 may be one roller of many other rollers within the material handling system 10. In some embodiments, the roller 102 may be an actively driven roller 102 with torque being supplied by the material handling system 10. In some embodiments, the roller 102 may have one or more bores disposed within it and configured to receive one or more components of the power generation system 100. In some embodiments, the roller 102 may be composed of plastic or metal, such as steel or aluminum.

In some embodiments, the roller 102 may include a rotor 104 configured to rotate and thereby rotate the roller 102. In some embodiments, the rotor 104 may include a rotating component and a fixed component. In some embodiments, the rotor 104 may be fixedly attached to one or more components of the material handling system 10. For example, the rotor may be fixedly attached to a conveyor rail 106 of the material handling system 10, as shown in at least FIG. 4. In some embodiments, the rotating component of the rotor may be coupled to the roller 102 and, when rotating, cause the roller 102 to rotate relative to the conveyor rail 106 (or other component of the material handling system 10 to which the rotor 104 is fixed).

In some embodiments, the roller 102 may include an end cap 108. In some embodiments, the end cap 108 may be substantially planar, disc-shaped, and arranged in parallel to the cylindrical roller 102. In some embodiments, the end cap 108 may include one or more protruding portions 110. In some embodiments, the end cap 108 may be composed of the same material as the roller 102, but it will be understood that in some embodiments the end cap 108 may be composed of one or more different materials from the roller 102. In some embodiments, the end cap 108 may be disposed on the end of the roller 102 including the rotor 104. In some embodiments, the end cap 108 may be molded onto the roller 102 such that the end cap 108 is fixedly attached to the roller 102. In some embodiments, the end cap 108 may be operably engaged with the roller 102 and removable from the roller 102 as desired. In some embodiments, the end cap 108 may be operably engaged with the rotor 104. In some embodiments, one or more components of the rotor 104 may be disposed through the end cap 108.

In some embodiments, the power generation system 100 may include one or more magnets 112A-112D. In some embodiments, the magnets 112A-D may be configured to generate a magnetic flux when the rotor 104 is rotating. In some embodiments, the rotational speed of the roller 102 may be increased or decreased to affect the strength of the magnetic flux. In some embodiments, the roller 102 may be rotated clockwise and/or counterclockwise as desired to change the direction of the magnetic flux. In some embodiments, the rotational speed and direction of the roller 102 (and, by extension, the strength and direction of the magnetic flux, respectively) may be manually controlled by a user of the power generation system 100 and/or the material handling system 10. In some embodiments, the rotational speed and direction of the roller 102 may be controlled according to one or more set programs input into a controller configured to control the power generation system 100 and/or the material handling system 10.

In some embodiments, the magnets 112A-D may be composed of a variety of different magnetic materials, including neodymium iron boron magnets, samarium cobalt magnets, alnico magnets, ceramic magnets, iron magnets, mixtures of iron and nickel magnets, flexible magnets, or any suitable magnetic material not explicitly listed in this disclosure. In some embodiments, the magnets 112A-D may include one or more permanent magnets, temporary magnets, or electromagnets, including any combination of these magnets, as well as any type of magnet not explicitly listed in this disclosure. Though four magnets 108A-D are shown in FIG. 1, it will be understood that more or fewer magnets may be used as desired. For example, a user may incorporate more magnets to generate a greater magnetic flux, or fewer magnets to generate less magnetic flux, thereby impacting the amount of electrical power generated by the power generation system 100.

Figure 6:
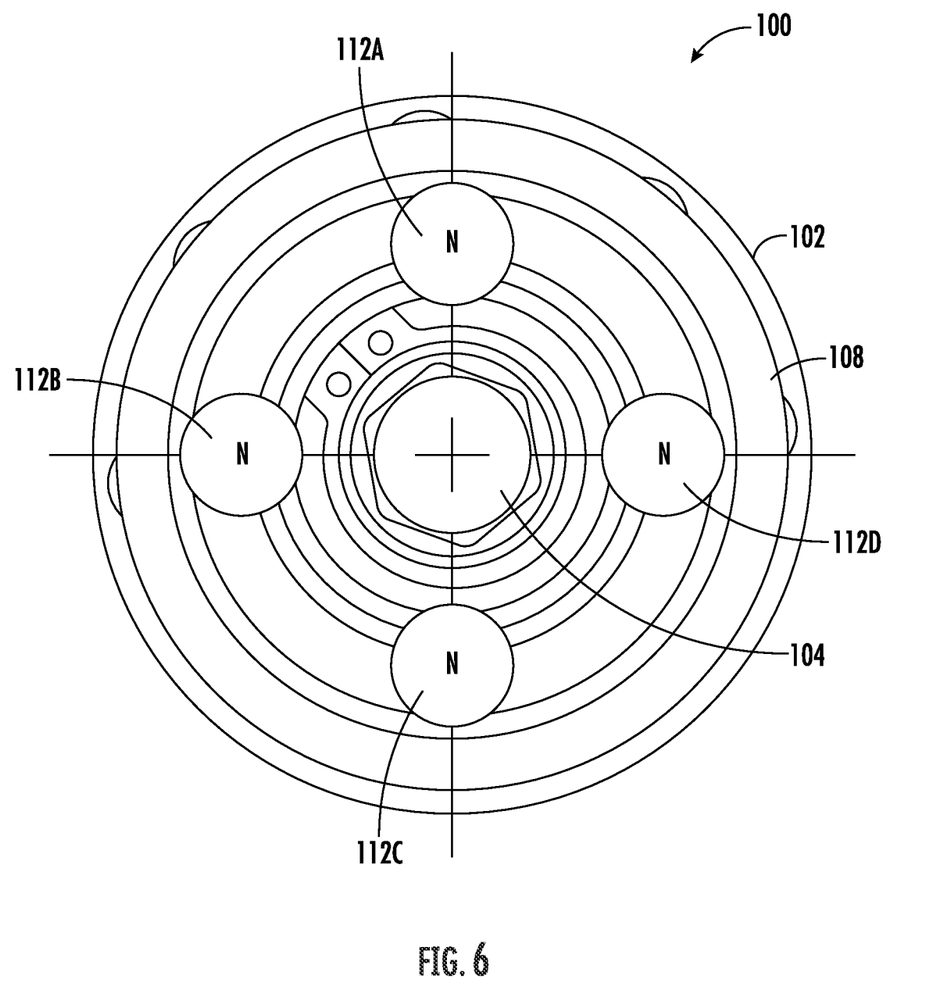
FIG. 6 is a top view of an example roller with embedded magnets in accordance with various embodiments of the present disclosure.

In some embodiments, and referring now to FIG. 3 in particular, the magnets 112A-D may be disposed annularly around the end cap 108 and/or the rotor 104. At least FIG. 6 shows them magnets 112A-D disposed at equal radii from the center of the end cap 108 and/or the rotor, but it will be understood that, in some embodiments, the magnets 112A-D may be disposed at equal or different radii (or a combination for different groups of magnets 112A-D) from the center of the end cap 108 and/or the rotor 104.

Figure 7:
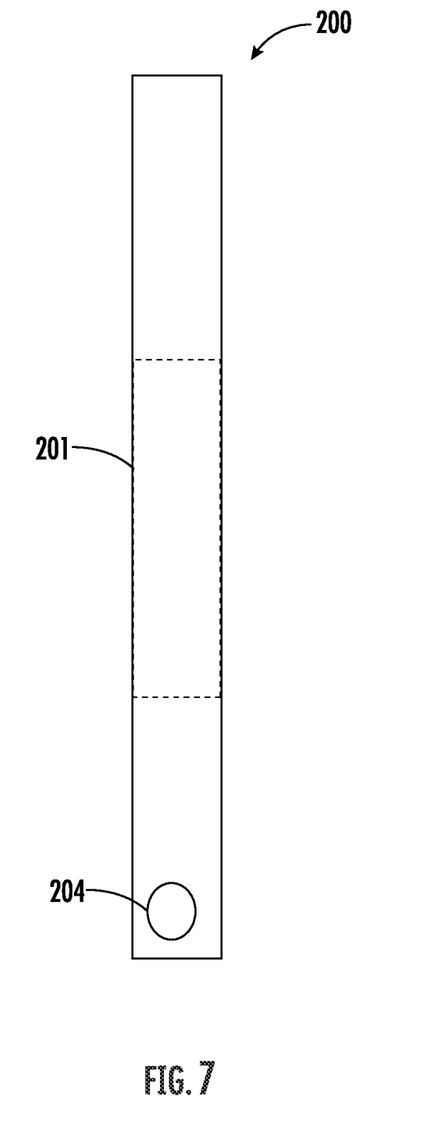
FIG. 7 is an elevation side view of an example pick-up assembly in accordance with various embodiments of the present disclosure.
Figure 8:
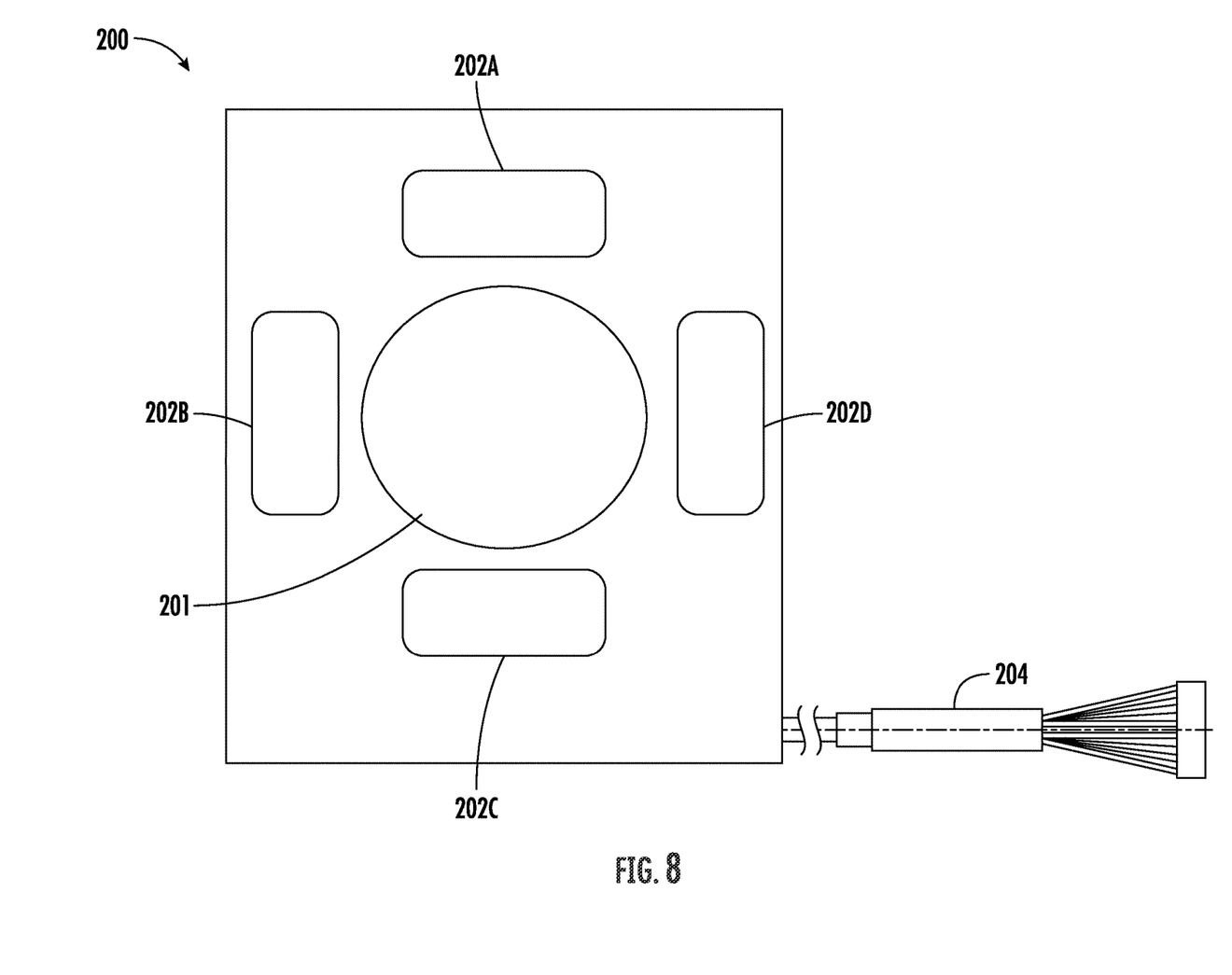
FIG. 8 is a top view of an example pick-up assembly in accordance with various embodiments of the present disclosure.

FIG. 7 shows an elevation side view of an example pick-up assembly 200, and FIG. 8 shows a top view of the example pick-up assembly 200. In some embodiments, the power generation system 100 may include the pick-up assembly 200. In some embodiments, the pick-up assembly 200 may be rectangularly shaped and configured to be operably engaged with the roller 102 and/or one or more components of the material handling system 10 (e.g., the pick-up assembly 200 may be operably engaged with a conveyor rail or frame 14 of the material handling system 10). In some embodiments, the pick-up assembly may be composed of metal, plastic, or composite material. In some embodiments, the pick-up assembly may include one or more ports for receiving various components of the power generation system 100 and/or the material handling system 10. In some embodiments, the pick-up assembly 200 may include a receiving hole 201 configured to receive the roller 102, the one rotor 104, and/or one or more protruding portions 110 of the end cap 108.

In some embodiments, the pick-up assembly may include one or more coils 202A-D, as shown in at least FIG. 8. In some embodiments, the one or more coils 202A-D may be configured to intersect the magnetic flux generated by the magnets 112A-D and thereby generate a current (or currents) traveling down the pick-up coils 202A-D. In some embodiments, the one or more coils 202A-D may be composed of metal, such as a highly-conductive metal like copper, or any other material suitable for generating a current when intersected by the magnetic flux. For example, the one or more coils 202A-D may be composed of aluminum or fiber. In some embodiments, the one or more coils 202A-D may be composed of different materials, such that one pick-up coil is composed of copper and another is composed of aluminum. In some embodiments, the one or more coils 202A-D may be embedded within or otherwise attached to the pick-up assembly 200. In some embodiments, the one or more coils 202A-D may be attached to the roller 102 or various other components of the power generation system 100.

In some embodiments, and as shown in at least FIGS. 7 and 8, the power generation system 100 or the pick-up assembly 200 may include an interface cable 204 disposed at least partially within the pick-up assembly 200. In some embodiments, the interface cable 204 may be electrically connected to a power supply of the material handling system 10. In some embodiments, the interface cable 204 may be configured to connect the one or more coils 202A-D to a power supply of the material handling system 10, such that the current generated by the magnetic flux intersecting with the one or more coils 202A-D is transmitted through the interface cable 204 to the power supply of the material handling system 10. In some embodiments, the one or more coils 202A-D may be directly connected to the power supply. In some embodiments, multiple interface cables 204 may be connected to the power supplies of the material handling system 10. In some embodiments, one or more of the coils 202A-D may be directly connected to a power supply of the material handling system 10 while other coils 202A-D are connected via one or more interface cables 204 to the power supply of the material handling system 10.

Figure 9:
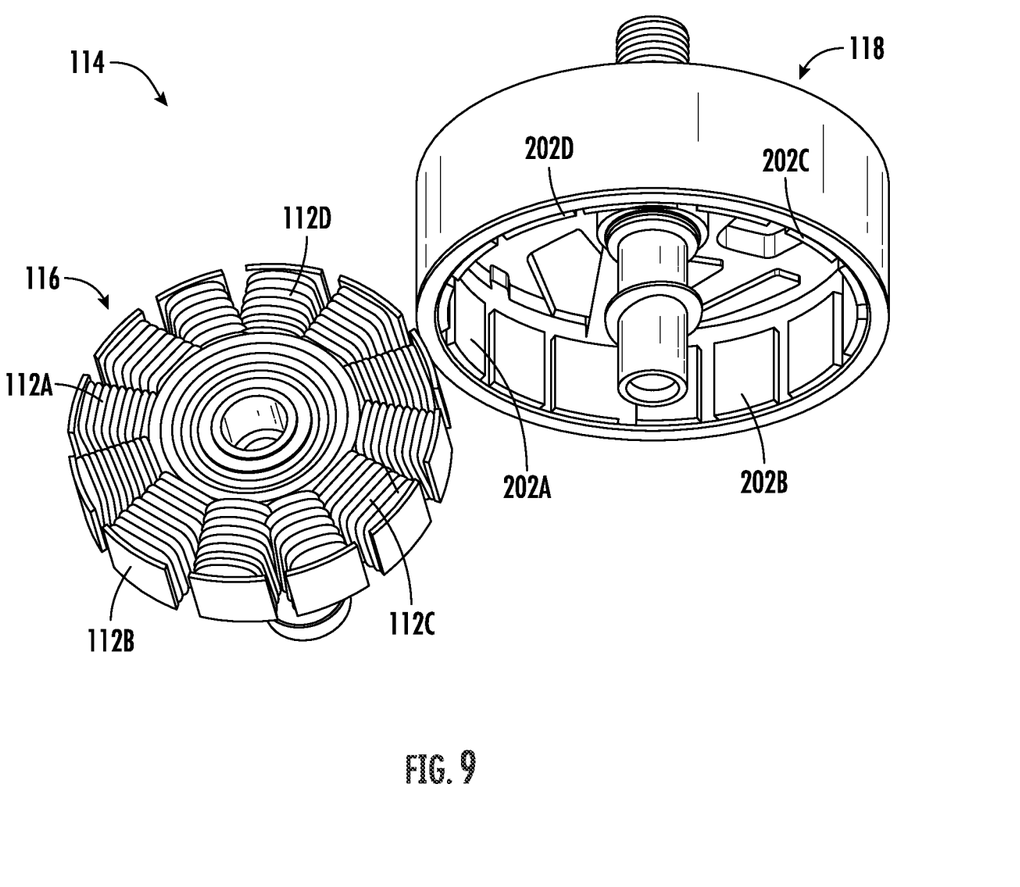
FIG. 9 is an angled top view of an example rotary system in accordance with various embodiments of the present disclosure.

In some embodiments, and as shown in at least FIG. 9, the roller 102 may include a rotary system 114. In some embodiments, the plurality of magnets 112A-D and one or more coils 202A-D may be operably engaged with one or more components of the rotary system 114. In some embodiments, the rotary system 114 may include a magnetically-coupled stator 116. In some embodiments, the rotary system 114 may include a coil-coupled rotor 118. In some embodiments, the configuration of the rotary system 114 may be such that the magnetically-coupled stator 116 is the non-stationary component and the coil-coupled rotor 118 is the stationary component. That is, in some embodiments, the magnetically-coupled stator 116 may be configured to rotate while the coil-coupled rotor 118 is configured to remain stationary when the rotary system 114 is active.

In some embodiments, and still referring to FIG. 9, the magnetically-coupled stator 116 may include the plurality of magnets 112A-D. In some embodiments, the plurality of magnets 112A-D may be fixedly attached to the magnetically-coupled stator 116. In some embodiments, the plurality of magnets 112A-D may be configured to function as similarly described when attached to the rotor 102.

Figure 10:
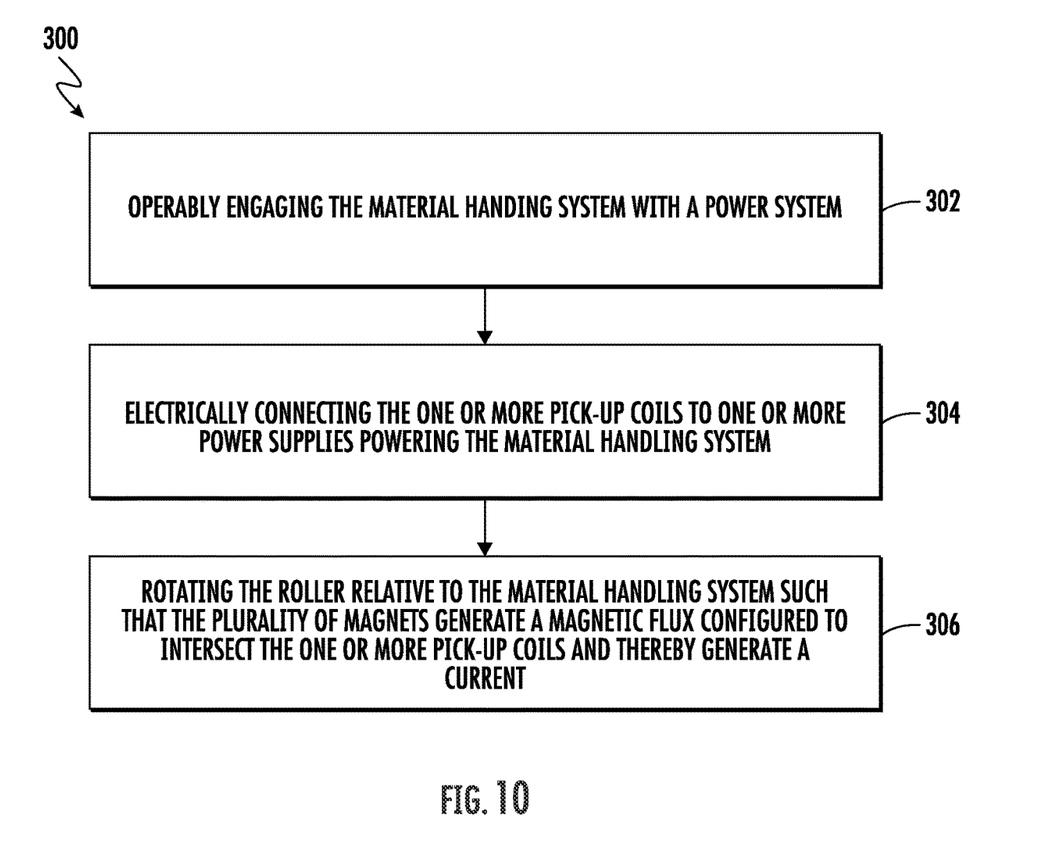
FIG. 10 is a flow chart illustrating an example method of powering a material handling system in accordance with various embodiments of the present disclosure.

In some embodiments, and still referring to FIG. 9, the coil-coupled rotor 118 may include the one or more coils 202A-D. In some embodiments, the one or more coils 202A-D may be fixed to an inner surface of the coil-coupled rotor 118. In some embodiments, the one or more coils 202A-D may be configured to function as similarly described in this disclosure. In some embodiments, the magnetically-coupled stator 116 may be configured to rotate relative to the coil-coupled rotor 118 during operation of the power generation system 100 and thereby cause the plurality of magnets 112A-D to generate a current traveling along the one or more coils 202A-D Methods of Powering a Material Handling System FIG. 10 is an example flow diagram illustrating an example method 300 of powering a material handling system. In some embodiments, the example method 300 may be implemented using the material handling system 10, power generation system 100, and/or the pick-up assembly 200 as previously described in this disclosure. In some embodiments, the steps in the example flow diagrams in FIG. 10 may be performed sequentially, while in some embodiments the steps may be performed simultaneously, or in any order necessary to achieve a desired outcome. In some embodiments, the steps may be performed by individual subsystems of the power generation system 100 or subassemblies of the pickup assembly 200. In some aspects, the steps in the method 300 may be performed using any suitable system, assembly, or components thereof not disclosed explicitly in this disclosure.

In some embodiments, the method 300 may include a step 302 of operably engaging components of the material handling system with a power generation system. In some embodiments, the method 300 may include a step 304 of electrically connecting the one or more pick-up coils to one or more power supplies powering components in the material handling system. In some embodiments, the method 300 may include a step 306 of rotating the roller relative to the material handling system such that the plurality of magnets generate a magnetic flux configured to intersect the one or more pick-up coils and thereby generate a current.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated, in light of the present disclosure, that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A power generation system comprising:
   a roller;
   an end cap fixedly connected to the roller,
   wherein the end cap is configured to be operably engaged with a material handling system;
   a plurality of magnets disposed on or within the end cap; and
   a pick-up assembly comprising one or more pick-up coils,
   wherein the pick-up assembly is configured to be operably engaged with the end cap and the material handling system,
   wherein the roller is configured to rotate such that the plurality of magnets rotate relative to the material handling system and generate a magnetic flux configured to intersect the one or more pick-up coils and thereby generate a current.

2. The power generation system of claim 1, further comprising an interface cable electrically connected to the pick-up assembly and configured to connect the pick-up assembly to one or more power supplies powering the material handling system.

3. The power generation system of claim 2, wherein the roller comprises a bore configured to receive at least a portion of the interface cable.

4. The power generation system of claim 2, wherein the one or more power supplies comprises a battery.

5. The power generation system of claim 1, wherein the one or more pick-up coils comprise copper wiring.

6. The power generation system of claim 1, wherein the pick-up assembly comprises a receiving hole and the roller comprises a rotor, wherein the rotor is configured to be disposed through at least a portion of receiving hole when the end cap is operably engaged with the material handling system.

7. The power generation system of claim 6, wherein the one or more pick-up coils are disposed annularly around the receiving hole of the pick-up assembly.

8. The power generation system of claim 1, wherein the end cap comprises a molded end-cap fixedly attached to the roller.

9. The power generation system of claim 1, wherein the material handling system comprises a conveyor system configured to support one or more objects.

10. The power generation system of claim 1, wherein the roller comprises an active roller configured to spin freely relative to the material handling system.

11. A power generation system comprising:
    a roller comprising:
       a coil-coupled rotor configured to be fixed relative to the roller and comprising one or more coils;
       a magnetically-coupled stator configured to rotate relative to the coil-coupled rotor and comprising a plurality of magnets configured to generate a magnetic flux when the magnetically-coupled stator rotates,
       wherein the magnetic flux is configured to intersect the one or more coils of the coil-coupled rotor and thereby generate a current.

12. The power generation system of claim 11, further comprising an interface cable electrically connected to the pick-up assembly and configured to connect the pick-up assembly to one or more power supplies powering the material handling system.

13. The power generation system of claim 12, wherein the one or more power supplies comprises a battery.

14. The power generation system of claim 12, wherein the one or more pick-up coils comprise copper wiring.

15. The power generation system of claim 12, wherein the pick-up assembly comprises a receiving hole and the roller comprises a coil-coupled rotor, wherein the coil-coupled rotor is configured to be disposed through at least a portion of receiving hole when the end cap is operably engaged with the material handling system.

16. The power generation system of claim 15, wherein the one or more pick-up coils are disposed annularly around the receiving hole of the pick-up assembly.

17. The power generation system of claim 11, wherein the roller comprises a bore configured to receive at least a portion of the interface cable.

18. The power generation system of claim 11, wherein the end cap comprises a molded end-cap fixedly attached to the roller.

19. The power generation system of claim 11, wherein the material handling system comprises a conveyor system configured to support one or more objects.

20. A method of powering a material handling system, the method comprising:
    operably engaging the material handling system with a power generation system,
    wherein the material handling system comprises:
       a roller;
       an end cap fixedly connected to the roller,
       a plurality of magnets disposed on or within the end cap; and
       a pick-up assembly comprising one or more pick-up coils;
    electrically connecting the one or more pick-up coils to one or more power supplies powering the material handling system; and
    rotating the roller relative to the material handling system such that the plurality of magnets generate a magnetic flux configured to intersect the one or more pick-up coils and thereby generate a current.

* * * * *